United States Patent
Ando

(10) Patent No.: US 9,938,968 B2
(45) Date of Patent: Apr. 10, 2018

(54) CRYOPUMP SYSTEM AND METHOD FOR CONTROLLING THE CRYOPUMP SYSTEM

(75) Inventor: Masamichi Ando, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 177 days.

(21) Appl. No.: 13/137,896

(22) Filed: Sep. 21, 2011

(65) Prior Publication Data

US 2012/0067065 A1 Mar. 22, 2012

(30) Foreign Application Priority Data

Sep. 21, 2010 (JP) ................. 2010-211282

(51) Int. Cl.
| | | |
|---|---|---|
| *B01D 8/00* | (2006.01) | |
| *F04B 37/08* | (2006.01) | |
| *F04B 49/06* | (2006.01) | |

(52) U.S. Cl.
CPC ............. *F04B 37/08* (2013.01); *B01D 8/00* (2013.01); *F04B 49/065* (2013.01); *F25B 2600/027* (2013.01); *F25B 2600/0253* (2013.01)

(58) Field of Classification Search
CPC .......... F25B 2309/1428; F25B 2600/02; F25B 2600/024; F25B 2400/06–2400/077; F04B 49/06; F04B 49/065; F04B 49/20; F04B 2203/0204; F04B 2203/0404; F04B 2207/045; F04B 2207/047
USPC ........................................ 62/55.5
See application file for complete search history.

(56) References Cited

U.S. PATENT DOCUMENTS

| | | | | |
|---|---|---|---|---|
| 4,502,842 | A * | 3/1985 | Currier et al. ................. 417/8 |
| 7,409,833 | B2 * | 8/2008 | Unger et al. .................. 62/196.2 |
| 7,854,596 | B2 * | 12/2010 | Schnetzka ............ F04B 39/0027 |
| | | | | 318/461 |
| 2007/0107448 | A1* | 5/2007 | Dresens et al. .................. 62/149 |
| 2008/0078189 | A1* | 4/2008 | Ando ............................ 62/55.5 |
| 2008/0175717 | A1* | 7/2008 | Schnetzka et al. ............... 417/3 |
| 2010/0186427 | A1* | 7/2010 | Okada et al. ................... 62/55.5 |
| 2011/0162959 | A1 | 7/2011 | Okada et al. |

FOREIGN PATENT DOCUMENTS

| | | |
|---|---|---|
| JP | 52-079351 A | 7/1977 |
| JP | 2004-003792 A | 1/2004 |
| JP | 2007-502928 A | 2/2007 |
| JP | 2009-275579 A | 11/2009 |
| WO | WO-2005019744 A1 | 3/2005 |
| WO | WO-2009/028450 A1 | 3/2009 |
| WO | WO-2010/038416 A1 | 4/2010 |

OTHER PUBLICATIONS

Office Action issued in Japanese Patent Application No. 2010-211282, dated Sep. 17, 2013.

\* cited by examiner

*Primary Examiner* — Tareq Alosh
(74) *Attorney, Agent, or Firm* — Michael Best & Friedrich LLP

(57) ABSTRACT

A cryopump system includes: a plurality of cryopumps; a plurality of compressor units arranged to operate in parallel in accordance with a control output, respectively, to supply refrigerant gas to the plurality of cryopumps; and a cryopump controller operative to determine the control output for each of the plurality of compressor units. The cryopump controller adjusts a preset value for at least one of the compressor units, the preset value being utilized to determine the control output, so that operation statuses of the respective compressor units are substantially equalized.

6 Claims, 8 Drawing Sheets

FIG.7

| CURRENT PRESET DIFFERENTIAL PRESSURE VALUE FOR RESPECTIVE COMPRESSORS | (i) A=B | | | (ii) A>B | | | (iii) A<B | | |
|---|---|---|---|---|---|---|---|---|---|
| DETERMINED FREQUENCY DIFFERENCE | A<B | A>B | — | A<B | A>B | — | A<B | A>B | — |
| LESS THAN 10 Hz | — | — | — | — | — | — | — | — | — |
| EQUAL TO OR MORE THAN 10 Hz | B −0.01 | A −0.01 | — | B −0.01 | B +0.01 | — | A +0.01 | A −0.01 | — |

US 9,938,968 B2

CRYOPUMP SYSTEM AND METHOD FOR CONTROLLING THE CRYOPUMP SYSTEM

BACKGROUND OF THE INVENTION

1. Field of the Invention

The present invention relates to a cryopump system provided with a plurality of cryopumps and a method for controlling the cryopump system.

2. Description of the Related Art

A plurality of cryopumps may be applied to one large volume in order to draw a vacuum on the large volume. A plurality of cryopumps may be mounted to a vacuum processing apparatus having a plurality of vacuum chambers in order to draw a vacuum on the respective vacuum chambers of the vacuum processing apparatus. If the number of the cryopumps is small, one shared compressor is provided for circulating refrigerant gas for the plurality of cryopumps. For a large-scale vacuum-pumping system having more cryopumps, a plurality of compressors may be provided. In a similar manner, a cryogenic system having a plurality of cryogenic devices such as cryogenic refrigerators can include a plurality of compressors.

SUMMARY OF THE INVENTION

A cryopump system according to an aspect of the present invention includes: a plurality of cryopumps; a plurality of compressor units arranged to operate in parallel in accordance with a control output, respectively, to supply refrigerant gas to the plurality of cryopumps; and a control unit operative to determine the control output for each of the plurality of compressor units. The control unit may adjust a preset value for at least one of the compressor units, the preset value being utilized to determine the control output, so that operation statuses of the respective compressor units are substantially equalized.

Another aspect of the present invention is a method for controlling a plurality of compressor units operated in parallel to supply refrigerant gas to a plurality of cryopump. The method including: determining a control output for the plurality of compressor units, respectively; and substantially equalizing operation statuses of the respective compressor units by adjusting a preset value for at least one of the compressor units, the value being utilized for determining the control output.

Yet another aspect of the present invention is a cryopump system. The cryopump system includes: a plurality of cryopumps; a plurality of compressor units arranged to operate in parallel in accordance with a control output, respectively, to supply refrigerant gas to the plurality of cryopumps; and a control unit operative to determine the control output for each of the plurality of compressor units.

BRIEF DESCRIPTION OF THE DRAWINGS

FIG. 7 shows an adjustment table utilized in a preset value adjustment process according to an exemplary embodiment of the present invention.

DETAILED DESCRIPTION OF THE INVENTION

Figure 1:
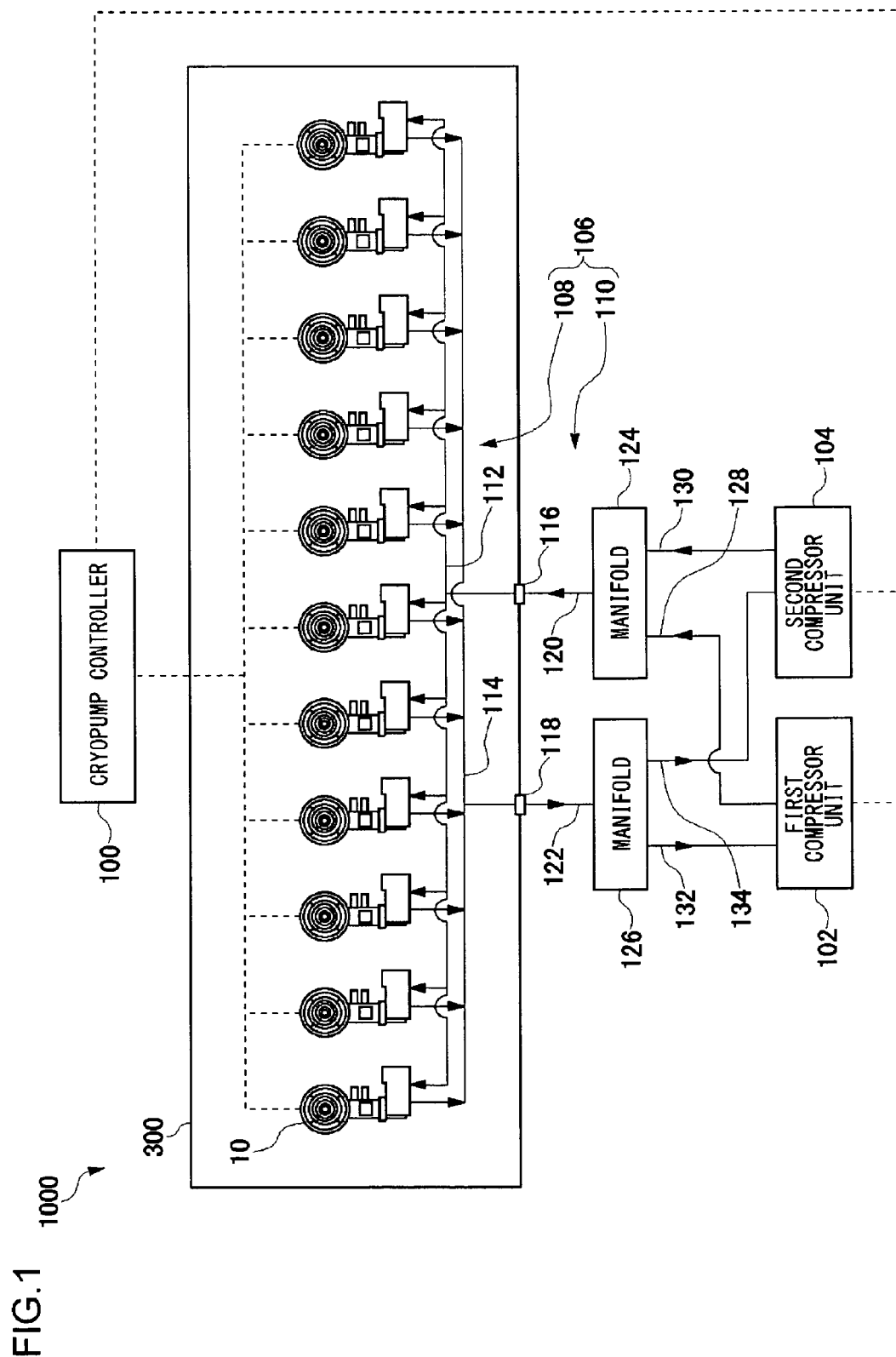
FIG. 1 schematically shows the entire structure of a cryopump system according to an exemplary embodiment of the present invention.

The present invention will now be described by reference to preferred embodiments. This does not intend to limit the scope of the invention, but to exemplify the invention.

With a system provided with a plurality of compressors, incase one of the compressors tends to be operated frequently or to be operated under a heavy load, the evolution of the wear damage of the compressor is faster than that of other compressors. As a result, the maintenance frequency for the system may be increased. Accordingly, a disadvantage may occur, such as an increased down time of the system.

It is desirable, in case of applying a plurality of compressors to a plurality of cryogenic apparatuses (e.g., cryopumps), to allow the plurality of compressors to share load more evenly.

First, an explanation will be given on an overview of exemplary embodiments according to the present invention, which will be described below. According to an exemplary embodiment of the present invention, a cryopump system is provided, wherein a plurality of compressors are provided in parallel. According to an exemplary embodiment, at least two compressors are controlled independently and operated at the same time. A preset value defined for each of the compressors is adjusted at a certain frequency so as to substantially equalize the operation statuses of respective compressors. Whereby the divergence of the operation statuses of the respective compressors, which may increase as time progresses, can be restricted and a load may be shared evenly. The divergence of the operation statuses results from, for example, individual differences among the respective compressors. For example, the divergence is considered to result from individual differences among main bodies of the compressors, individual differences among sensors or other devices provided with the main bodies, or differences in the length or the arrangement of a piping system that connects the respective compressors and the cryopumps.

According to an exemplary embodiment, an refrigerant gas circulation apparatus for collecting refrigerant gas from a common load and for supplying the operation gas is provided. The common load is a destination to supply the refrigerant gas, and may include a plurality of cryogenic devices. The cryogenic device may be a cryogenic refrigerator that creates cool conditions by a refrigeration cycle. The cryogenic device may be a cryopump including a cryopanel that is cooled by the cryogenic refrigerator. The refrigerant gas circulation apparatus may comprise a plurality of compressor units connected to a common load in parallel, respectively, and operated in accordance with a control output, and a control unit operative to determine the control output for each of the plurality of compressor units. The control unit may adjust a preset value for at least one of the compressor units, the preset value being utilized to determine the control output, so that operation statuses of respective compressor units are equalized.

The control unit may be configured with one controller, or may include a plurality of controllers, wherein each of the controllers performs the same function, or different functions. For example, the control unit may comprise compressor controllers, which are provided at respective compressor units and determine control outputs for the respective compressor units, and a cryopump controller, which integrally controls a cryopump system. In this case, the adjustment of the preset value may be performed by the compressor controller, or may be performed by the cryopump controller.

While the divergence of the operation statuses is within an allowable range, the present value may not be adjusted. That is, the preset value may be kept constant. For example, if there is a margin for the number of compressors or the capability thereof with respect to a load, it is expected that the adjustment of the preset value is not required and the parallel arrangement of the compressors allows by itself the operating statuses to equalize. Therefore, a system structure wherein a plurality of compressors work as supply sources or return sides of refrigerant gas arranged in parallel to individual devices is advantageous by itself.

Thus, a cryogenic system according to an exemplary embodiment, may comprise: a plurality of cryogenic devices, a plurality of compressor units arranged in parallel with each other in order to supply and return refrigerant gas to and from the plurality of cryogenic devices, and a piping system that connects the plurality of cryogenic devices and the plurality of compressor units in order to supply and return refrigerant gas to and from the plurality of cryogenic devices. The piping system may include a shared line arranged to integrally supply and return refrigerant gas between the plurality of cryogenic devices and the plurality of compressor units. The shared line may comprise a supply line for collecting refrigerant gas delivered from respective compressor units and for supplying the refrigerant gas to the plurality of cryogenic devices. The shared line may comprise a return line for collecting refrigerant gas exhausted from the plurality of cryogenic devices and for returning the refrigerant gas to the plurality compressor units.

The piping system may include a separate pipe for supplying and a separate pipe for returning attached to each of the compressor units. Respective compressor units may be connected to the shared line by respective separate pipes. A joint unit thereof may be a manifold. In a similar manner, the piping system may include a separate pipe attached to each of the cryogenic devices. Respective cryogenic devices may be connected the shared line by respective separate pipes.

According to an exemplary embodiment, the control unit may adjust, in order to reduce a difference in control outputs between a specific compressor unit among the plurality of compressor units and another compressor unit among the plurality of compressor units, a preset value for at least one of: (a) the specific compressor unit; and (b) the other compressor unit. The equalization of the operation statuses may be achieved by reducing the difference in control outputs in the aforementioned manner. The control unit may determine a control output for respective compressor units so that a measurement value related to respective compressor units approaches a target value defined for respective compressor units. The control output may be, for example, the operating frequency of a compressor motor for operating a compressor main body of the compressor unit.

According to a preferable exemplary embodiment, a differential pressure stabilization control process may be performed wherein a control output for each compressor unit is determined so that a differential pressure between a supply side and a return side of each compressor unit agrees with a target differential pressure. The differential pressure stabilization control process is performed while, for example, using the operating frequency of the compressor motor that operates the compressor main body as the control output. According to a preferred exemplary embodiment, a temperature control process may be performed along with the differential pressure stabilization control process. With the temperature control process, the operating frequency of a refrigerator of each cryopump is controlled so that a cryopanel of each cryopump is cooled to a target temperature. The differential pressure stabilization control process and the temperature control process contribute to save energy as will be described later. According to an exemplary embodiment, a target differential pressure of at least one of the compressor units may be adjusted during the execution of the differential pressure stabilization control process. The equalization of operation statuses during the differential pressure stabilization control process can be achieved.

FIG. 1 schematically shows the entire structure of a cryopump system 1000 according to an exemplary embodiment of the present invention. The cryopump system 1000 is used for vacuum-pumping a vacuum apparatus 300. The vacuum apparatus 300 is a vacuum processing apparatus that processes an object in a vacuum environment, for example an apparatus used at a semiconductor manufacturing process such as, an ion implantation apparatus, a sputtering apparatus, or the like.

The cryopump system 1000 includes a plurality of cryopumps 10. These cryopumps 10 are mounted to one or more vacuum chambers (not shown) of the vacuum apparatus 300 and used to increase the vacuum level inside the vacuum chamber to a level required by a desired process. The cryopump 10 is operated in accordance with a control output determined by a cryopump controller 100 (hereinafter, also referred to as a CP controller). A high level vacuum, for example, $10^{-5}$ Pa to $10^{-8}$ Pa is realized in the vacuum chamber. In an example shown in the figure, eleven cryopumps 10 are included in the cryopump system 1000. The plurality of cryopumps 10 may have the same vacuum performance, or may have different vacuum performances.

The cryopump system 1000 comprises a CP controller 100. The CP controller 100 controls a cryopump 10, and compressor units 102 and 104. The CP controller 100 comprises a CPU that executes various types of arithmetic computing processes, a ROM that stores various types of control programs, a RAM that is used as a work area for storing data or executing a program, an I/O interface, a memory, or the like. The CP controller 100 is configured to be able to communicate with a host controller (not shown) for controlling the vacuum apparatus 300. The host controller of the vacuum apparatus 300 may also be referred to as an upper level controller that integrally controls respective constituent elements of the vacuum apparatus 300 including the cryopump system 1000.

The cryopump system 1000 is configured separately from the cryopump 10, and the compressor units 102 and 104. The CP controller 100 is communicably connected with the cryopump 10 and the compressor units 102 and 104. Each cryopump 10 comprises an I/O module 50 (cf. FIG. 4) that performs an input/output processing for a communication with the CP controller 100. The CP controller 100 and respective I/O modules 50 are connected with each other by a control communication line. In FIG. 1, the control communication line between the cryopump 10 and the CP controller 100, and the control communication line between the compressor units 102 and 104 and the CP controller 100 are indicated with dashed lines. The CP controller 100 may be integrally structured with one of the cryopumps 10 or the compressor units 102 or 104.

The CP controller 100 comprises a plurality of compressor units that includes at least the first compressor unit 102 and the second compressor unit 104. The compressor units are provided to circulate refrigerant gas through a closed fluid circuit including the cryopumps 10. The compressor unit collects the refrigerant gas from the cryopump 10 and delivers the refrigerant gas again to the cryopumps 10. The compressor unit is installed apart from the vacuum apparatus 300, or in proximity to the vacuum apparatus 300. The compressor unit is operated in accordance with a control output determined by a compressor controller 168 (cf. FIG. 4). Alternatively, the compressor unit is operated in accordance with a control output determined by the CP controller 100.

Although an explanation will be given below on the cryopump system 1000 having two compressor units 102 and 104 as a representative example, the present invention is not limited thereto. In a similar manner with that of the compressor units 102 and 104, the cryopump system 1000 may be configured so that more than two compressor units are connect in parallel to a plurality of cryopumps 10. Although the cryopump system 1000 shown in FIG. 1 comprises a plurality of cryopumps 10 and a plurality of compressor units 102 and 104, respectively, the number of cryopumps 10, or the number of compressor units 102 and 104 may be one.

According to the exemplary embodiment, the plurality of compressor units are the same compressor unit. Simply stated, the plurality of compressor units belong to the same product. That is, the plurality of compressor units may be deemed to have a substantially same performance except for individual differences that the apparatuses have. According another exemplary embodiment, a plurality of compressor units may include a different compressor unit.

The plurality of cryopumps 10 and the plurality of compressor units 102 and 104 are connected by an refrigerant gas piping system 106. The piping system 106 connects the plurality of cryopumps 10 and the plurality of compressor units 102 and 104 in parallel among each other. The piping system 106 is configured so as to allow refrigerant gas to flow between the plurality of cryopumps 10 and the plurality of compressor units 102 and 104. By the piping system 106, a plurality of compressor units are connected to one cryopump 10 in parallel, respectively, and a plurality of cryopumps 10 are connected to one compressor unit in parallel, respectively.

The piping system 106 is configured to include an interior pipe 108 and an exterior pipe 110. The interior pipe 108 is formed inside of the vacuum apparatus 300 and includes an interior supply line 112 and an interior return line 114. The exterior pipe 110 is installed outside of the vacuum apparatus 300, and includes an exterior supply line 120 and an exterior return line 122. The exterior pipe 110 connects between the vacuum apparatus 300 and the plurality of compressor units 102 and 104.

Figure 2:
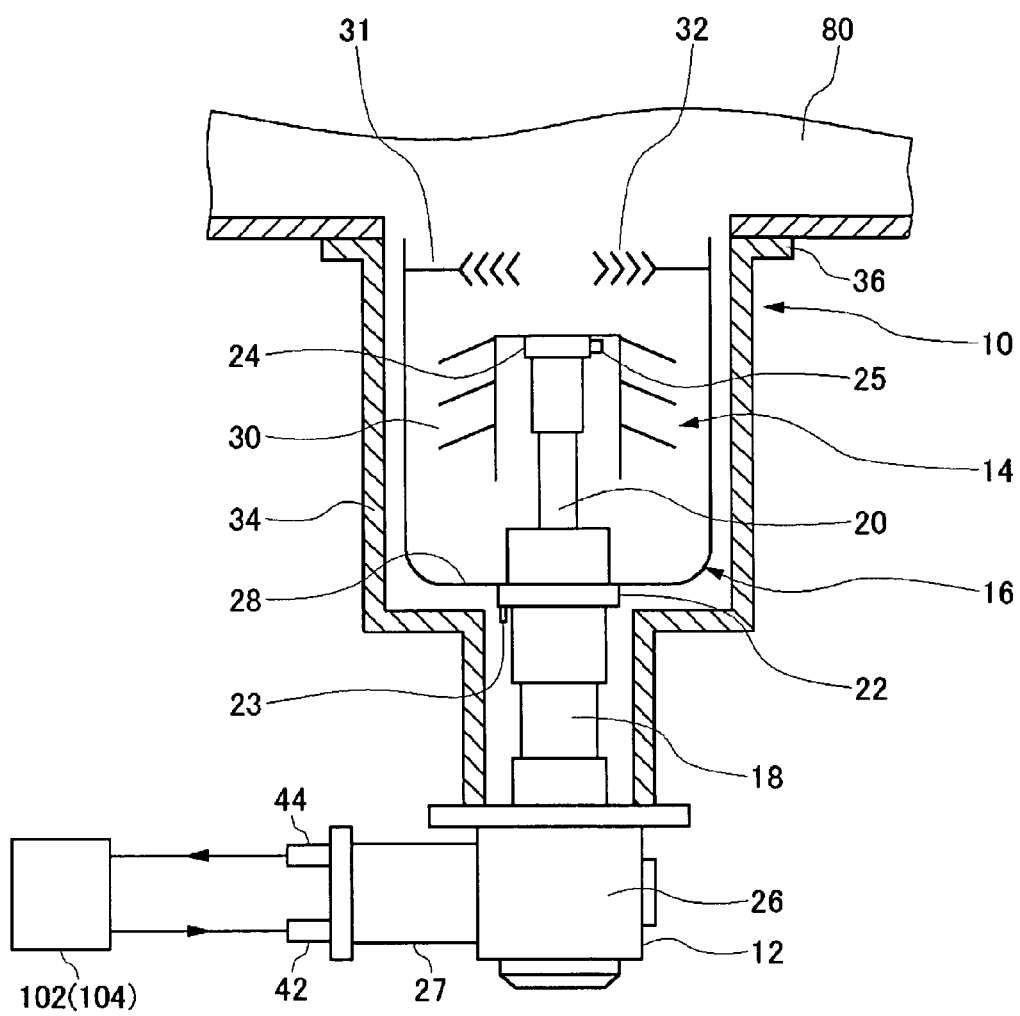
FIG. 2 schematically shows a cross-sectional view of a cryopump according to an exemplary embodiment of the present invention.

The interior supply line 112 is connected to a gas inlet 42 of respective cryopumps 10 (cf. FIG. 2), and the interior return line 114 is connected to a gas outlet 44 of respective cryopumps 10 (cf. FIG. 2). The interior supply line 112 is connected to one end of the exterior supply line 120 of the exterior pipe 110 by a gas supply port 116 of the vacuum apparatus 300. The interior return line 114 is connected to one end of the exterior return line 122 of the exterior pipe 110 by a gas return port 118 of the vacuum apparatus 300.

The other end of the exterior supply line 120 is connected to a first manifold 124, and the other end of the exterior return line 122 is connected to a second manifold 126. To the first manifold 124 are connected one end of a first supply pipe 128 of the first compressor unit 102 and one end of a second supply pipe 130 of the second compressor unit 104. The other ends of the first supply pipe 128 and the second supply pipe 130 are connected to the supply ports 148 of corresponding compressor units 102 and 104, respectively (cf. FIG. 3). To the second manifold 126 are connected one end of a first return pipe 132 of the first compressor unit 102 and one end of a second return pipe 134 of the second compressor unit 104. The other ends of the first return pipe 132 and the second return pipe 134 are connected to return ports 146 of corresponding compressor units 102 and 104, respectively (cf. FIG. 3).

In this way, a shared supply line for collecting refrigerant gas delivered from the plurality of compressor units 102 and 104 respectively, and for supplying refrigerant gas to the plurality of cryopumps 10 is configured by the interior supply line 112 and the exterior supply line 120. Further, a shared return line for collecting refrigerant gas exhausted from the plurality of cryopumps 10 and for returning the refrigerant gas to the plurality of compressor units 102 and 104 is configured by the interior return line 114 and the exterior return line 122. Each of the plurality of compressor units are connected to the shared line through a separate pipe attached to each of the compressor units. At a joint portion of the separate pipes and the shared line, a manifold for merging the separate pipes is provided. The first manifold 124 merges the separate pipes at a supplying side and the second manifold 126 merges the separate pipes at a collecting side.

Although in the example shown in the figure, the vacuum apparatus 300 comprises one gas supply port 116 and one gas return port 118, the scope of the invention is not limited thereto. The vacuum apparatus 300 may comprise a plurality of gas supply ports 116 and a plurality of gas return ports 118. In this case, separate pipes for the plurality of compressor units may be connected to a corresponding gas supply port and a gas return port, respectively.

The piping system 106 may be configured so that the exterior pipe 110 is directly connected to the gas inlet 42 and the gas outlet 44 of respective cryopumps 10. In this case, manifolds may also be provided at the cryopump 10 side ends of the exterior supply line 120 and the exterior return line 122, respectively, and the shared line may be branched to respective cryopumps 10.

A check valve (not shown) may be provided on supply pipes 128 and 130 and on return pipes 132 and 134 of respective compressor units 102 and 104 to regulate gas flowing in the direction reverse to a prescribed gas flow direction (e.g., the directions shown with arrows in the figures). In a similar manner, a check valve may be provided also on the supply lines 112 and 120, and return lines 114 and 122.

The aforementioned shared line may be considerably long (different from the figure), depending on the lay-out of various types of apparatuses at a location where the cryopump system 1000 is used (e.g., semiconductor manufacturing plant). By collecting refrigerant gas to the shared line, the total length of pipes can be shortened in comparison with the case where each of a plurality of compressors are separately connected to a vacuum apparatus. Further, since the pipe arrangement is configured so that a plurality of compressors are connected to respective supply targets of refrigerant gas (e.g., respective cryopumps 10 in the cryopump system 1000), the pipe arrangement also has redundancy. By arranging a plurality of compressors to respective targets (e.g., cryopumps) in parallel and operating the compressors in parallel, the load to the plurality of compressors are shared by the compressors.

FIG. 2 schematically shows a cross-sectional view of a cryopump 10 according to an exemplary embodiment of the present invention. The cryopump 10 comprises a first cryopanel cooled to a first cooling temperature level and a second cryopanel cooled to a second cooling temperature level lower than the first cooling temperature level. The first cryopanel condenses and captures a gas having a sufficiently-low vapor pressure at the first cooling temperature level so as to pump out the gas accordingly. For example, the first cryopanel pumps out a gas having a vapor pressure lower than a reference vapor pressure (e.g., $10^{-8}$ Pa). The second cryopanel condenses and captures a gas having a sufficiently-low vapor pressure at the second cooling temperature level so as to pump out the gas accordingly. In order to capture a non-condensible gas that cannot be condensed at the second temperature level due to its high vapor pressure, an adsorption area is formed on the surface of the second cryopanel. The adsorption area is formed by, for example, providing an adsorbent on the panel surface. A non-condensible gas is adsorbed by the adsorption area cooled to the second temperature level and pumped out, accordingly.

The cryopump 10 shown in FIG. 2 comprises a refrigerator 12, a panel assembly 14 and a heat shield 16. The refrigerator 12 cools by a thermal cycle wherein the refrigerator 12 intakes refrigerant gas, expands the gas inside of the refrigerator, and discharges the gas, accordingly. The panel assembly 14 includes a plurality of cryopanels, which are cooled by the refrigerator 12. A cryogenic temperature surface for capturing a gas by condensation or adsorption so as to pump out the gas, is formed on the panel surface. The surface (e.g., rear face) of the cryopanel is normally provided with an adsorbent such as charcoal or the like in order to adsorb a gas. The heat shield 16 is provided in order to protect the panel assembly 14 from ambient radiation heat.

The cryopump 10 is a so-called vertical-type cryopump, where the refrigerator 12 is inserted and arranged along the axial direction of the heat shield 16. The present invention is also applicable to a so-called horizontal-type cryopump in a similar manner, where the second cooling stage of the refrigerator is inserted and arranged along the direction that intersects (usually orthogonally) with the axis of the heat shield 16. FIG. 1 schematically shows a horizontal-type cryopump 10.

The refrigerator 12 is a Gifford-McMahon refrigerator (so-called GM refrigerator). The refrigerator 12 is a two-stage refrigerator comprising a first cylinder 18, a second cylinder 20, a first cooling stage 22, a second cooling stage 24 and a refrigerator motor 26. The first cylinder 18 and the second cylinder 20 are connected in series, in which a first displacer and a second displacer (not shown) coupled with each other are contained, respectively. A regenerator is incorporated into the first displacer and the second displacer. The refrigerator 12 may be a refrigerator other than the two-stage GM refrigerator. For example, a single-stage GM refrigerator may be used, or a pulse tube refrigerator or a Solvay refrigerator may be used.

In order to periodically repeat intake and discharge of the refrigerant gas, the refrigerator 12 includes a passage switching mechanism that periodically switches passages for the refrigerant gas. The passage switching mechanism includes, for example, a valve unit and a drive unit that drives the valve unit. The valve unit is, for example, a rotary valve and the drive unit is a motor for rotating the rotary valve. The motor may be, for example, an AC motor or a DC motor. The passage switching mechanism may be a mechanism of a direct acting type, which is driven by a linear motor.

The refrigerator motor 26 is provided at one end of the first cylinder 18. The refrigerator motor 26 is provided inside a motor housing 27 formed at the end portion of the first cylinder 18. The refrigerator motor 26 is connected to the first displacer and the second displacer so that the first displacer and the second displacer can reciprocally move inside the first cylinder 18 and the second cylinder 20, respectively. The refrigerator motor 26 is connected to a movable valve (not shown) provided inside the motor housing 27 so that the valve can rotate in the forward direction and the reverse direction.

The first cooling stage 22 is provided at the end portion of the first cylinder 18 on the second cylinder 20 side, i.e., at the portion connecting the first cylinder 18 and the second cylinder 20. The second cooling stage 24 is provided at the tail end of the second cylinder 20. The first cooling stage 22 and the second cooling stage 24 are fixed to the first cylinder 18 and the second cylinder 20, respectively, for example by brazing.

The refrigerator 12 is connected to the first compressor unit 102 or the second compressor unit 104 through the gas inlet 42 and the gas outlet 44 provided outside of the motor housing 27. The cryopump 10 and the first compressor unit 102 or the second compressor unit 104 are connected with each other as explained with reference to FIG. 1.

The refrigerator 12 expands a high pressure refrigerant gas (e.g., helium) supplied from the compressor units 102 and 104 so as to cool the first cooling stage 22 and the second cooling stage 24. The compressor units 102 and 104 collect the refrigerant gas expanded inside the refrigerator 12 and repressurize the gas and supply to the refrigerator 12, accordingly.

Specifically, a high pressure refrigerant gas is supplied to the refrigerator 12 from the compressor units 102 and 104. In this process, the refrigerator motor 26 drives the movable valve inside the motor housing 27 so that the gas inlet 42 and the inside space of the refrigerator 12 are connected with each other. When the inside space of the refrigerator 12 is filled with refrigerant gas with a high pressure, the refrigerator motor 26 switches the movable valve, and the inside space of the refrigerator 12 is connected to the gas outlet 44, accordingly. Thereby, the refrigerant gas is expanded and returned to the compressor units 102 and 104. In synchronization with the operation of the movable valve, the first displacer and the second displacer reciprocally move inside the first cylinder 18 and the second cylinder 20, respectively. By repeating such heat cycles, the refrigerator 12 generates cold states in the first cooling stage 22 and the second cooling stage 24.

The second cooling stage 24 is cooled to a temperature lower than that of the first cooling stage 22. The second cooling stage 24 is cooled to, for example, approximately 10 K to 20 K, while the first cooling stage is cooled to, for example, approximately 80 K to 100 K. A first temperature sensor 23 is mounted on the first cooling stage 22 in order to measure a temperature thereof, and a second temperature sensor 25 is mounted on the second cooling stage 24 in order to measure a temperature thereof.

The heat shield 16 is fixed and thermally connected to the first cooling stage 22 of the refrigerator 12, while the panel assembly 14 is fixed and thermally connected to the second cooling stage 24 of the refrigerator 12. Thereby, the heat shield 16 is cooled to a temperature nearly equal to that of the first cooling stage 22, while the panel assembly 14 is cooled to a temperature nearly equal to that of the second cooling stage 24. The heat shield 16 is formed into a cylindrical shape having an opening 31 at its one end. The opening 31 is defined by the interior surface at the end of the cylindrical side face of the heat shield 16.

On the other hand, on the side opposite to the opening 31, i.e., at the other end on the pump bottom side, of the heat shield 16, a closed portion 28 is formed. The closed portion 28 is formed by a flange portion extending in an inward radial direction at the end portion of the pump bottom side of the cylindrical side face of the heat shield 16. As the cryopump 10 shown in FIG. 2 is a vertical-type cryopump, the flange portion is mounted to the first cooling stage 22 of the refrigerator 12. Thereby, a cylindrically-shaped inside space 30 is formed within the heat shield 16. The refrigerator 12 protrudes into the inside space 30 along the central axis of the heat shield 16, and the second cooling stage 24 is inserted in the inside space 30.

In case of a horizontal-type cryopump, the closed portion 28 is usually closed completely. The refrigerator 12 is arranged so as to protrude into the inside space 30 along a direction orthogonal to the central axis of the heat shield 16 from an opening for attaching the refrigerator, formed on the side face of the heat shield 16. The first cooling stage 22 of the refrigerator 12 is mounted to the heat shield 16 at the opening for attaching the refrigerator, while the second cooling stage 24 of the refrigerator 12 is arranged in the inside space 30. On the second cooling stage 24, the panel assembly 14 is mounted. Therefore, the panel assembly 14 is arranged in the inside space 30 of the heat shield 16. Alternatively, the panel assembly 14 may be mounted to the second cooling stage 24 via an appropriately-shaped panel mounting member.

A baffle 32 is provided at the opening 31 of the heat shield 16. The baffle 32 is provided at a position spaced apart from the panel assembly 14 in the direction of the central axis of the heat shield 16. The baffle 32 is mounted in the end portion on the opening 31 side of the heat shield 16, and is cooled to a temperature nearly equal to that of the heat shield 16. The baffle 32 may be formed, for example, concentrically, or into other shapes such as a lattice shape, etc., when seen from the vacuum chamber 80 side. A gate valve (not shown) is provided between the baffle 32 and the vacuum chamber 80. The gate valve is, for example, closed when the cryopump 10 is regenerated and opened when the vacuum chamber 80 is evacuated by the cryopump 10. The vacuum chamber 80 is provided, for example in the vacuum apparatus 300 shown in FIG. 1.

The heat shield 16, the baffle 32, the panel assembly 14, and the first cooling stage 22 and the second cooling stage 24 of the refrigerator 12, are contained inside the pump housing 34. The pump housing 34 is formed by connecting two cylinders in series, diameters of cylinders being different from each other. The end portion of the cylinder with a larger diameter is opened, and a flange portion 36 for connection with the vacuum chamber 80 is formed so as to extend outwardly in the radial direction. The end portion of the cylinder with a smaller diameter of the pump housing 34 is fixed to the motor housing 27 of the refrigerator 12. The cryopump 10 is fixed to an evacuation opening of the vacuum chamber 80 in an airtight manner via the flange portion 36 of the pump housing 34, allowing an airtight space integrated with the inside space of the vacuum chamber 80 to be formed. The pump housing 34 and the heat shield 16 are both formed into cylindrical shapes and arranged concentrically. Because the inner diameter of the pump housing 34 is slightly larger than the outer diameter of the heat shield 16, the heat shield 16 is arranged slightly spaced apart from the interior surface of the pump housing 34.

In operating the cryopump 10, the inside of the vacuum chamber 80 is first roughly evacuated to approximately 1 to 10 Pa by using another appropriate roughing pump before starting the operation. Thereafter, the cryopump 10 is operated. By driving the refrigerator 12, the first cooling stage 22 and the second cooling stage 24 are cooled, thereby the heat shield 16, the baffle 32, and the cryopanel assembly 14, which are thermally connected to the stages, are also cooled.

The cooled baffle 32 cools the gas molecules flowing from the vacuum chamber 80 into the cryopump 10 so that a gas whose vapor pressure is sufficiently low at the cooling temperature (e.g., water vapor or the like) will be condensed on the surface of the baffle 32 and pumped, accordingly. A gas whose vapor pressure is not sufficiently low at the cooling temperature of the baffle 32 enters into the heat shield 16 through the baffle 32. Of the entering gas molecules, a gas whose vapor pressure is sufficiently low at the cooling temperature of the panel assembly 14 (e.g., argon or the like) will be condensed on the surface of the panel assembly 14 and pumped, accordingly. A gas whose vapor pressure is not sufficiently low at the cooling temperature (e.g., hydrogen or the like) is adsorbed by an adsorbent, which is adhered to the surface of the panel assembly 14 and cooled, and the gas is pumped accordingly. In this way, the cryopump 10 can attain a desired degree of vacuum in the vacuum chamber 80.

Figure 3:
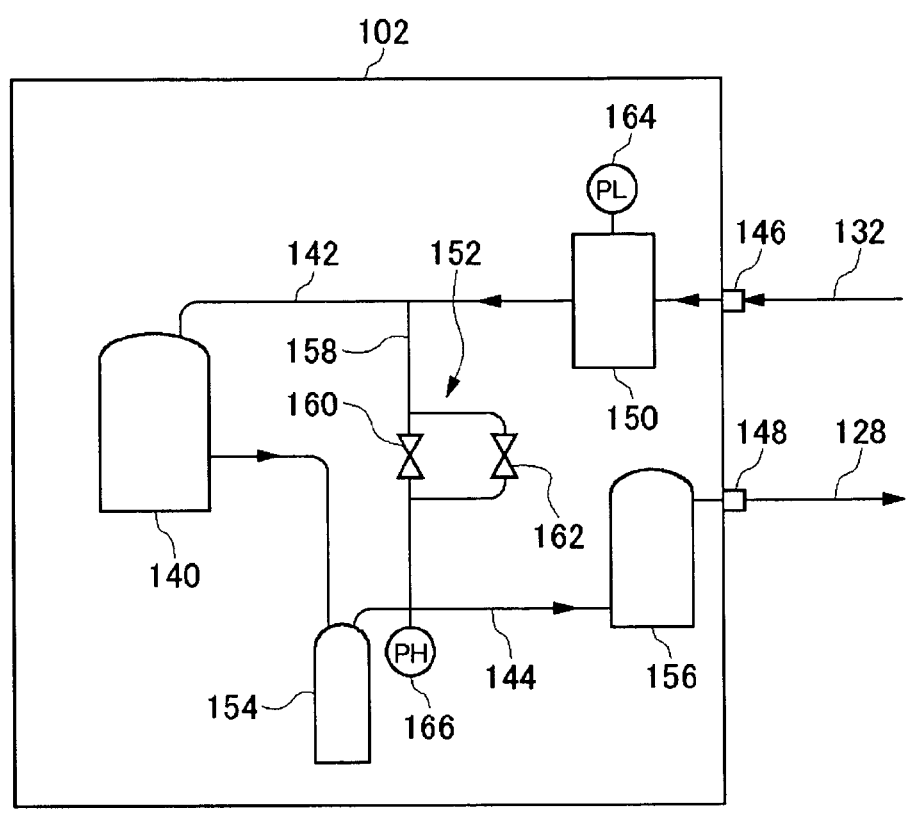
FIG. 3 schematically shows a compressor unit according to an exemplary embodiment of the present invention.

FIG. 3 schematically shows the compressor unit 102 according to an exemplary embodiment of the present invention. According to the exemplary embodiment, the second compressor unit 104 has a similar structure with that of the first compressor unit 102. The first compressor unit 102 is configured to include a compressor main body 140 raising the pressure of gas, a low pressure pipe 142 for supplying low pressure gas supplied from the outside to the compressor main body 140, and a high pressure pipe 144 for delivering high pressure gas compressed by the compressor main body 140.

As shown in FIG. 1, low pressure gas is supplied through the first return pipe 132 to the first compressor unit 102. The first compressor unit 102 receives gas returned from the cryopump 10 by the return port 146, and the refrigerant gas is delivered to the low pressure pipe 142, accordingly. The return port 146 is provided on a housing of the first compressor unit 102 at an end of the low pressure pipe 142. The low pressure pipe 142 connects the return port 146 and an intake opening of the compressor main body 140.

The low pressure pipe 142 comprises at its middle a storage tank 150 as a volume for eliminating pulsation included in returned gas. The storage tank 150 is provided between the return port 146 and a branch to a bypass mechanism 152, which will be described below. The refrigerant gas, with which the pulsation is eliminated in the storage tank 150, is supplied through the low pressure pipe 142 to the compressor main body 140. Inside of the storage tank 150, a filter for removing unnecessary particles, etc. from gas may be provided. Between the storage tank 150 and the return port 146, a receiving port and a pipe for replenishing refrigerant gas from the outside may be connected.

The compressor main body 140 is, for example, a scroll pump or a rotary pump, and performs a function of raising the pressure of gas. The compressor main body 140 sends the pressurized refrigerant gas to the high pressure pipe 144. The compressor main body 140 is configured to cool by using oil, and an oil cooling pipe that circulates oil is provided in association with the compressor main body 140. Thereby, the pressurized refrigerant gas is sent to the high pressure pipe 144, while the oil is mixed in with the refrigerant gas to some extent.

Therefore, at the middle of the high pressure pipe 144, an oil separator 154 is provided. Oil separated from refrigerant gas by the oil separator 154 may be returned to the low pressure pipe 142, and may be returned to the compressor main body 140 through the low pressure pipe 142. A relief valve for releasing excessive high pressure gas may be provided on the oil separator 154.

At the middle of the high pressure pipe 144 that connects between the compressor main body 140 and the oil separator 154, a heat exchanger for cooling high pressure refrigerant gas delivered from the compressor main body 140 may be provided (not shown). The heat exchanger cools the refrigerant gas by, for example, coolant water. The coolant water may be used for cooling the oil that cools the compressor main body 140. On the high pressure pipe 144, at least one of the upstream or the downstream of the heat exchanger, a temperature sensor for measuring the temperature of the refrigerant gas may be provided.

The refrigerant gas that has passed through the oil separator 154 is sent to an adsorber 156 through the high pressure pipe 144. The adsorber 156 is provided for removing contaminants that have not been removed by contaminant removing means provided on a flow passage, such as the filter in the storage tank 150, the oil separator 154, or the like. The adsorber 156 removes, for example, evaporated oil by adsorption.

The supply port 148 is provided on the housing of the first compressor unit 102 at an end of the high pressure pipe 144. That is, the high pressure pipe 144 connects between the compressor main body 140 and the supply port 148, and at the middle thereof, the oil separator 154 and the adsorber 156 are provided. The refrigerant gas that has passed through the adsorber 156 is delivered to the cryopump 10 through the supply port 148.

The first compressor unit 102 comprises the bypass mechanism 152 provided with a bypass pipe 158 that connects between the low pressure pipe 142 and the high pressure pipe 144. In the exemplary embodiment shown in the figure, the bypass pipe 158 is branched from the low pressure pipe 142 at a location between the storage tank 150 and the compressor main body 140. Further, the bypass pipe 158 is branched from the high pressure pipe 144 at a location between the oil separator 154 and the adsorber 156.

The bypass mechanism 152 comprises a control valve for controlling the flux of refrigerant gas that is not delivered to the cryopump 10 and detours from the high pressure pipe 144 to the low pressure pipe 142. In the exemplary embodiment shown in the figure, a first control valve 160 and a second control valve 162 are provided in parallel at the middle of the bypass pipe 158. The first control valve 160 and the second control valve 162 are, for example, a normally-closed type or normally-opened type solenoid valve. According to the exemplary embodiment, the second control valve 162 is used as a flux control valve of the bypass pipe 158. Hereinafter, the second control valve 162 may also be referred to as a relief valve 162.

The first compressor unit 102 comprises a first pressure sensor 164 for measuring the pressure of return gas returned from the cryopump 10 and a second pressure sensor 166 for measuring the pressure of supply gas to be delivered to the cryopump 10. Since the pressure of the supply gas is higher than that of the return gas during the operation of the first compressor unit 102, The first pressure sensor 164 and the second pressure sensor 166 may also be referred to as a low pressure sensor and a high pressure sensor, respectively.

The first pressure sensor 164 is provided to measure the pressure of the low pressure pipe 142, and the second pressure sensor 166 is provided to measure the pressure of the high pressure pipe 144. The first pressure sensor 164 is installed, for example in the storage tank 150 and measures the pressure of return gas, of which the pulsation is eliminated at the storage tank 150. The first pressure sensor 164 may be provided at any positions on the low pressure pipe 142. The second pressure sensor 166 is provided between the oil separator 154 and the adsorber 156. The second pressure sensor 166 may be provided at any positions on the high pressure pipe 144.

The first pressure sensor 164 and the second pressure sensor 166 may be provided outside of the first compressor unit 102, for example, may be provided on the first return pipe 132 and the first supply pipe 128. The bypass mechanism 152 may also be provided outside of the first compressor unit 102. For example, the bypass pipe 158 may connect the first return pipe 132 and the first supply pipe 128.

Figure 4:
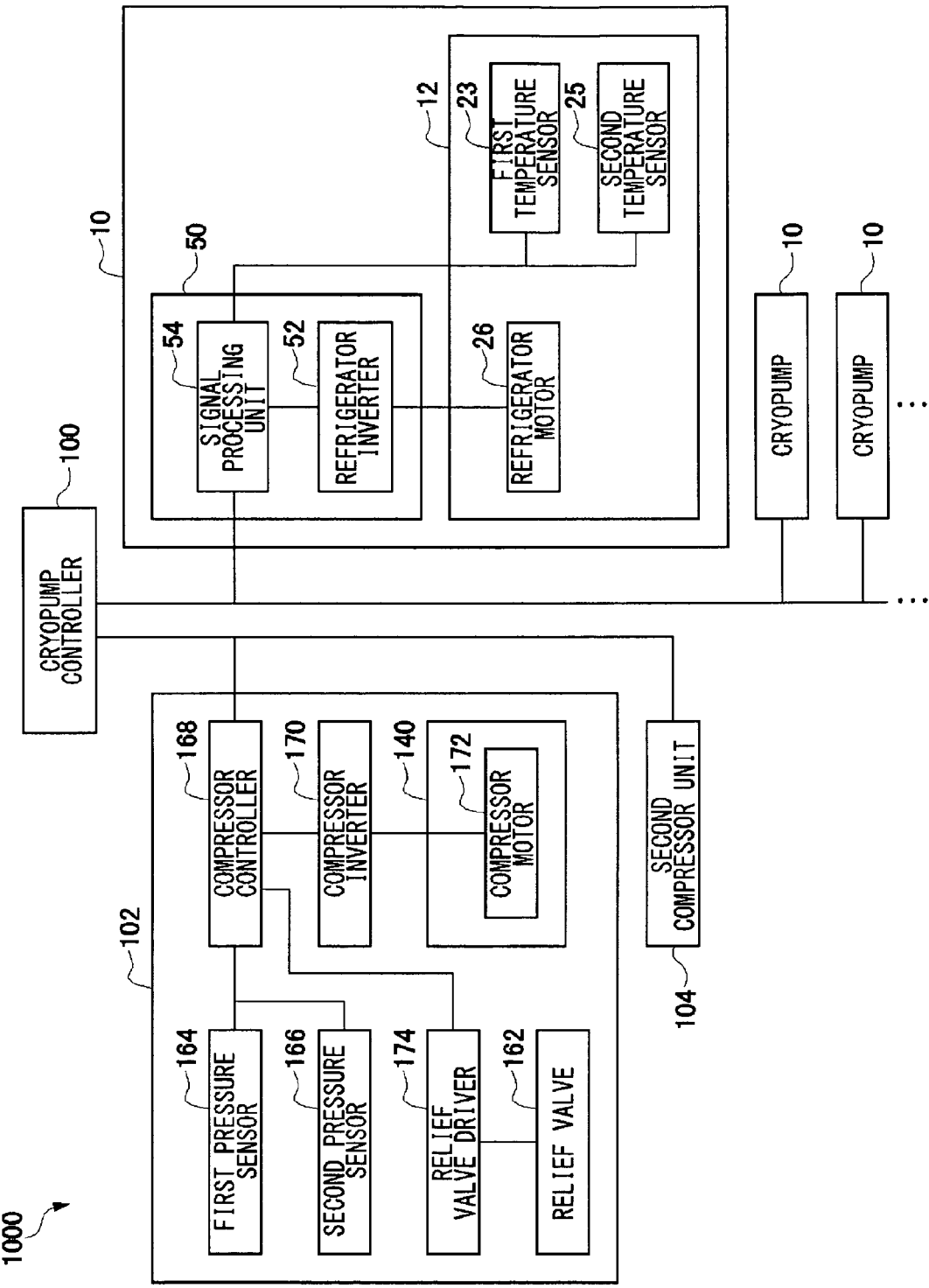
FIG. 4 shows a control block diagram with respect to a cryopump system according to the exemplary embodiment.

FIG. 4 shows a control block diagram with respect to the cryopump system 1000 according to the exemplary embodiment. FIG. 4 shows a main part of the cryopump system 1000 with respect to an exemplary embodiment of the present invention. One of the plurality of cryopumps 10 is shown in detail while illustrations for other cryopumps 10 are omitted since they are configured in a similar manner. Likewise, the first compressor unit 102 is shown in detail, while the illustration for the second compressor unit 104 is omitted since the second compressor unit 104 is configured in a similar manner.

As described above, the CP controller 100 is communicably connected to the I/O modules 50 of respective cryopumps 10. The I/O module 50 includes a refrigerator inverter 52 and a signal processing unit 54. The refrigerator inverter 52 adjusts power of prescribed voltage and frequency supplied from an external power source (e.g., commercial power) and supplies the power to the refrigerator motor 26. The voltage and the frequency of the power to be supplied to the refrigerator motor 26 are controlled by the CP controller 100.

The CP controller 100 determines a control output based on a sensor output signal. The signal processing unit 54 passes the control output transmitted from the CP controller 100 to the refrigerator inverter 52. For example, the signal processing unit 54 converts the control signal from the CP controller 100 into a signal that can be processed at the refrigerator inverter 52 and transmits the converted signal to the refrigerator inverter 52. The control signal includes a signal indicating the operating frequency of the refrigerator motor 26. The signal processing unit 54 passes an output from various sensors of the cryopump 10 to the CP controller 100. For example, the signal processing unit 54 converts a sensor output signal into a signal that can be processed at the CP controller 100 and transmits the converted signal to the CP controller 100.

Various sensors including the first temperature sensor 23 and the second temperature sensor 25 are connected to the signal processing unit 54 of the I/O module 50. As described above, the first temperature sensor 23 measures the temperature of the first cooling stage 22 of the refrigerator 12 and the second temperature sensor 25 measures the temperature of the second cooling stage 24 of the refrigerator 12. The first temperature sensor 23 and the second temperature sensor 25 periodically measures the temperature of the first cooling stage 22 and the second cooling stage 24, respectively, and output signals indicating the measured temperatures. The values measured by the first temperature sensor 23 and the second temperature sensor 25 are input to the CP controller 100 at predetermined time intervals, and are stored and retained in a predetermined storage region of the CP controller 100, accordingly.

The CP controller 100 controls the refrigerator 12 based on the temperature of the cryopanel. The CP controller 100 provides an operation instruction to the refrigerator 12 so that an actual temperature of the cryopanel follows a target temperature. For example, the CP controller 100 controls the operating frequency of the refrigerator motor 26 by feedback control so as to minimize the deviation between the target temperature of the first stage cryopanel and the measured temperature of the first temperature sensor 23. The frequency of the heat cycle of the refrigerator 12 is determined in accordance with the operating frequency of the refrigerator motor 26. The target temperature of the first stage cryopanel is determined as a specification in accordance with a process performed in the vacuum chamber 80. In this case, the second cooling stage 24 of the refrigerator 12 and the panel assembly 14 are cooled to a temperature determined by the specification of the refrigerator 12 and a heat load from the outside.

In case the measured temperature of the first temperature sensor 23 is higher than the target temperature, the CP controller 100 outputs an instruction value to the I/O module 50 so as to increase the operating frequency of the refrigerator motor 26. In conjunction with the increase in the operating frequency of the motor, the frequency of the heat cycle in the refrigerator 12 is also increased, and the first cooling stage 22 of the refrigerator 12 is cooled towards the target temperature. Meanwhile, in case a measured temperature of the first temperature sensor 23 is lower than the target temperature, the operating frequency of the refrigerator motor 26 is decreased and the temperature of the first cooling stage 22 of the refrigerator 12 is raised towards the target temperature.

Under normal conditions, the target temperature of the first cooling stage 22 is defined as a constant value. Thus, the CP controller 100 outputs an instruction value so that, when a heat load on the cryopump 10 is increased, the operating frequency of the refrigerator motor 26 is increased, and when the heat load on the cryopump 10 is decreased, the operating frequency of the refrigerator motor 26 is decreased. The target temperature may be varied as appropriate. For example, the target temperature of the cryopanel may be defined sequentially so that a targeted ambient pressure is realized in a given volume, which is to be pumped. The CP controller 100 may control the operating frequency of the refrigerator motor 26 so that the actual temperature of the second cryopanel is in agreement with a target temperature.

At a typical cryopump, the frequency of heat cycle is set as a constant value at any given time. The cryopump is set to operate with a relatively high frequency so as to permit a rapid cooling from a room temperature to the operating temperature of the pump. In case a heat load from the outside is small, the temperature of a cryopanel is controlled by warming with a heater. Therefore, the power consumption is high. In contrast, since the heat cycle frequency is controlled in accordance with a heat load on the cryopump 10 according to the exemplary embodiment. Therefore, a cryopump with excellent energy saving performance can be implemented. In addition, it is not necessarily required to provide a heater, which also contributes to reduction of the power consumption.

The CP controller 100 is communicably connected to the compressor controller 168. The controller of the cryopump system 1000 according to an exemplary embodiment of the present invention is configured with a plurality of controllers including the CP controller 100 and the compressor controller 168. According to another exemplary embodiment, the controller of the cryopump system 1000 may be configured with one CP controller 100, and IO modules may be provided in the compressor units 102 and 104 as substitute for the compressor controllers 168. In this case, the IO module relays a control signal between the CP controller 100 and respective constituent elements of the compressor units 102 and 104.

The compressor controller 168 controls the first compressor unit 102 based on a control signal from the CP controller 100, or controls the first compressor unit 102 independently from the CP controller 100. According to an exemplary embodiment, the compressor controller 168 receives a signal indicating various preset values from the CP controller 100 and controls the first compressor unit 102 by using the preset values. The compressor controller 168 determines a control output based on a sensor output signal. In a similar manner as with the CP controller 100, the compressor controller 168 comprises a CPU that executes various types of arithmetic computing processes, a ROM that stores various types of control programs, a RAM that is used as a work area for storing data or executing a program, an I/O interface, a memory, or the like.

The compressor controller 168 transmits a signal indicating the operating status of the first compressor unit 102 to the CP controller 100. The signal indicating the operating status includes, for example, measurement pressures of the first pressure sensor 164 and the second pressure sensor 166, an opening degree or a control current of the relief valve 162, the operating frequency of a compressor motor 172, or the like.

The first compressor unit 102 includes a compressor inverter 170 and the compressor motor 172. The compressor motor 172 is a motor, which allows the compressor main body 140 to operate and whose operating frequency is variable. The compressor motor 172 is provided in the compressor main body 140. In a similar manner with that of the refrigerator motor 26, various motors may be adopted as the compressor motor 172. The compressor controller 168 controls the compressor inverter 170. The compressor inverter 170 adjusts power of prescribed voltage and frequency supplied from an external power source (e.g., commercial power) and supplies the power to the compressor motor 172. The voltage and the frequency of the power to be supplied to the compressor motor 172 is controlled by the compressor controller 168.

To the compressor controller 168 are connected various sensors including the first pressure sensor 164 and the second pressure sensor 166. As described above, the first pressure sensor 164 periodically measures the pressure of the return side of the compressor main body 140, and the second pressure sensor 166 periodically measures the pressure of the supply side of the compressor main body 140. The values measured by the first pressure sensor 164 and the second pressure sensor 166 are input to the compressor controller 168 at predetermined time intervals, and are stored and retained in a predetermined storage region of the compressor controller 168, accordingly.

The relief valve 162 described above is connected to the compressor controller 168. A relief valve driver 174 for driving the relief valve 162 is provided in association with the relief valve 162 and the relief valve driver 174 is connected to the compressor controller 168. The compressor controller 168 determines the opening degree of the relief valve 162, and provides a control signal indicating the opening degree to the relief valve driver 174. The relief valve driver 174 controls the relief valve 162 so that the valve is opened with the opening degree. In this way, the flux of refrigerant gas of the bypass mechanism 152 is controlled. The relief valve driver 174 may be built in the compressor controller 168.

The compressor controller 168 controls the compressor main body 140 so that the differential pressure between an inlet and an outlet of the first compressor unit 102 (Hereinafter, also referred to as a compressor differential pressure) is maintained to a target differential pressure. For example, the compressor controller 168 performs feedback control so as to maintain the differential pressure between the inlet and the outlet of the first compressor unit 102 to a constant value. According to an exemplary embodiment, the compressor controller 168 calculates the compressor differential pressure from the measurement value of the first pressure sensor 164 and the second pressure sensor 166. The compressor controller 168 determines the operating frequency of the compressor motor 172 so that the compressor differential pressure and the target value agree. The compressor controller 168 controls the compressor inverter 170 so as to achieve the operating frequency.

A differential pressure stabilization process in the aforementioned manner realizes a further reduction of power consumption. In case a heat load on the cryopump 10 and the refrigerator 12 is low, the heat cycle frequency of the refrigerator 12 is decreased by the cryopanel temperature control described above. Accordingly, the flux of refrigerant gas required at the refrigerator 12 is reduced, and thus the differential pressure between the inlet and the outlet of the first compressor unit 102 is expected to increase. However, according to the exemplary embodiment, the operating frequency of the compressor motor 172 is controlled so as to maintain the compressor differential pressure to a constant value. In this case, the operating frequency of the compressor motor 172 is reduced so as to decrease the differential pressure to the target value. Therefore, the power consumption can be reduced in comparison with the case where a compressor is always operated at a constant operating frequency as with a typical cryopump.

Meanwhile, if a heat load on the cryopump 10 is increased, the operating frequency of the compressor motor 172 is increased so as to maintain the compressor differential pressure to a constant value. Therefore, the flux of refrigerant gas to the refrigerator 12 can be secured sufficiently, and thus the divergence of the temperature of the cryopanel from the target temperature, which results from the increase of a heat load, can be restricted to a minimum.

Figure 5:
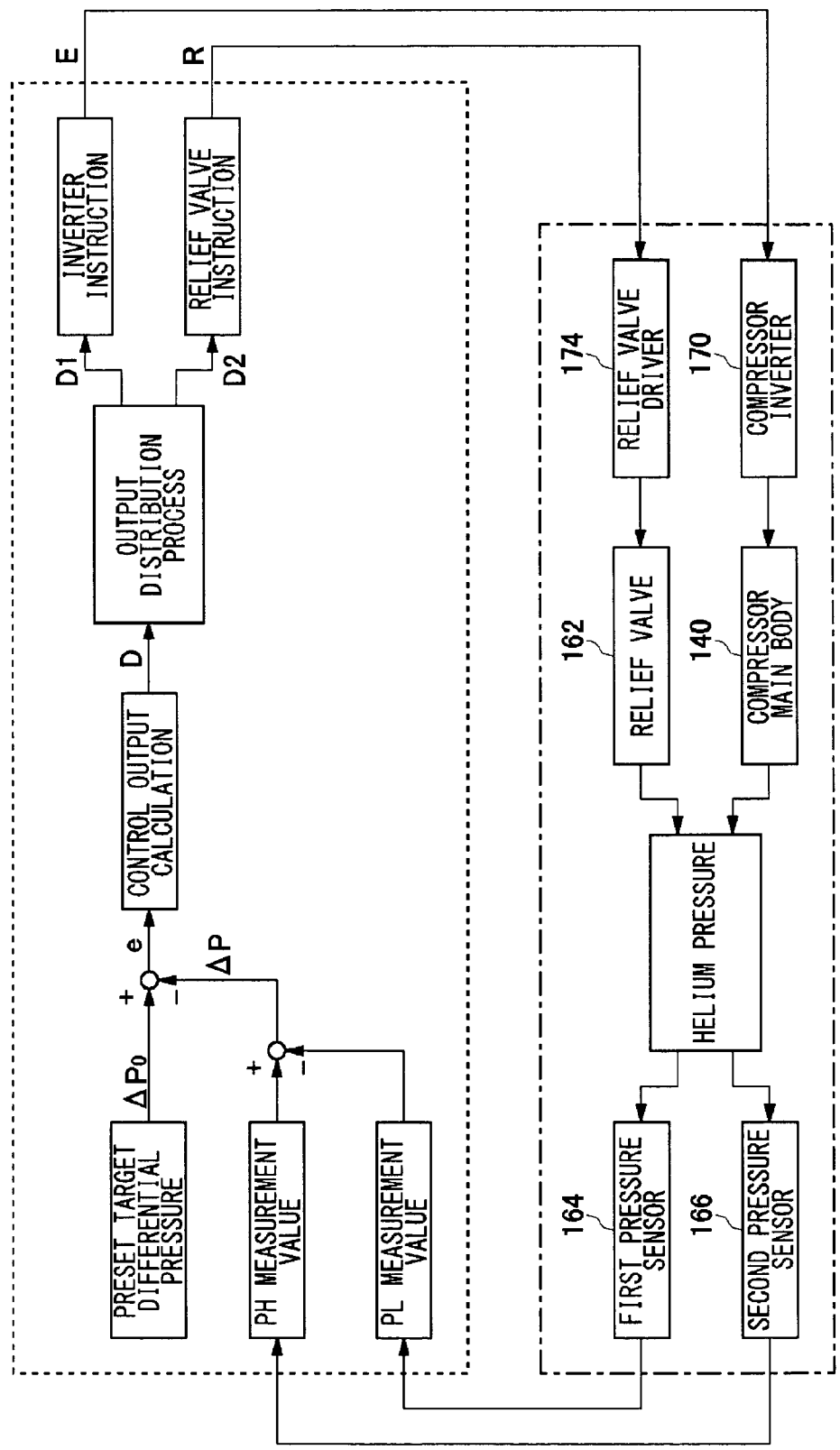
FIG. 5 is a diagram for illustrating a control flow of a differential pressure stabilization control process according to an exemplary embodiment of the present invention.

FIG. 5 is a diagram for illustrating a control flow of a differential pressure stabilization control process according to an exemplary embodiment of the present invention. FIG. 5 shows an overview of the control flow according to an exemplary embodiment. The differential pressure stabilization control process is performed by combining the operating frequency of the compressor motor 172 and the opening degree of the relief valve 162 as the control outputs. According to another exemplary embodiment, the differential pressure stabilization control process may be performed by adopting one of the operating frequency of the compressor motor 172 and the opening degree of the relief valve 162.

The control process shown in FIG. 5 is executed by the compressor controller 168 repeatedly at predetermined time intervals during the operation of the cryopump 10. This process is executed at respective compressor controllers 168 of the respective compressor units 102 and 104, independently from other compressor units 102 and 104. In FIG. 5, a portion indicating arithmetic processing in the compressor controller 168 is partitioned by dashed lines, and a portion indicating hardware operation of the compressor units 102 and 104 is partitioned by alternate long and short dashed lines.

As shown in FIG. 5, a target differential pressure is defined for the compressor controller 168 and is input into the compressor controller 168 in advance. The target differential pressure is, for example, defined in the CP controller 100 and provided to the compressor controller 168. A measurement pressure PL of the return side is measured by the first pressure sensor 164, and a measurement pressure PH of the supply side is measured by the second pressure sensor 166. The measurement pressures are provided from respective sensors to the compressor controller 168. At normal operating conditions, the measurement pressure PL of the first pressure sensor 164 is lower than the measurement pressure PH of the second pressure sensor 166.

The compressor controller 168 subtracts the return side measurement pressure PL from the supply side measurement pressure PH and calculates a measurement differential pressure $\Delta P$, and further calculates a differential pressure deviation e by subtracting the measurement differential pressure $\Delta P$ from a preset differential pressure $\Delta P_0$. The compressor controller 168 calculates a control output D from the differential pressure deviation e by predetermined control output arithmetic processing including, for example, a PID calculation.

The compressor controller 168 performs an output distribution process, wherein the control output D is divided into a control output D1 provided for the compressor inverter 170 and into a control output D2 provided for the relief valve 162. According to an exemplary embodiment, the compressor controller 168 may allocate most of the control output D to the relief valve control output D2 in case the control output D is less than a predetermine threshold value. For example, the compressor controller 168 may allocate a minimal portion of the control output required for the operation of the compressor to the inverter control output D1 and may allocate all the rest of the control output to the relief valve control output D2. In case the control output D is equal to or more than the threshold value thereof, the compressor controller 168 may allocate all of the control output D to the inverter control output D1 (i.e., D=D1).

In this manner, in case a required control output is relatively small, a pressure is released from the high pressure side to the low pressure side by controlling the relief valve so as to adjust the compressor differential pressure to a desired value. Meanwhile, in case the required control output is relatively large, the operation of the compressor is adjusted by an inverter control process so as to implement a required operation status. In stead of switching the inverter control and the relief valve control by a certain threshold value, in case the control output D is at a middle range including the threshold value, or for all the range of the control output D, the control output D may be divided and distributed to both of the inverter control output D1 and the relief valve control output D2.

The compressor controller 168 calculates an instruction value E to be provided for the compressor inverter 170 from the inverter control output D1, and calculates an instruction value R to be provided for the relief valve driver 174 from the relief valve control output D2. The inverter instruction value E is provided to the compressor inverter 170, and the operating frequency of the compressor main body 140 (i.e., the compressor motor 172) is controlled in accordance with the instruction. The relief valve instruction value R is provided to the relief valve driver 174, and the opening degree of the relief valve 162 is controlled in accordance with the instruction. Based on operation statuses of the compressor main body 140 and the relief valve 162, and the characteristic of relating pipe, tank, or the like, the pressure of helium, which is an refrigerant gas, is determined. The pressure of the helium determined in this manner is measured by the first pressure sensor 164 and the second pressure sensor 166.

In this way, the differential pressure stabilization control process is independently performed by respective compressor controllers 168 in the compressor units 102 and 104, respectively. The compressor controller 168 performs feedback control so as to minimize the differential pressure deviation e (preferably to zero). The compressor controller 168 performs the feedback control by switching modes between an inverter control mode wherein the operating frequency of the compressor is used as a variable to be manipulated, and a relief valve control mode wherein the opening degree of the relief valve is used as a variable to be manipulated, or by using the both modes in combination.

According to an exemplary embodiment, a preset target differential pressure is maintained to a constant value except for a preset value adjustment, which will be described later. A preset value other than the target differential pressure may be adjusted. Any preset value used to determine a control output (e.g., a gain used for the PID calculation wherein a control output is calculated, a distribution ratio of the control output distribution process, the threshold value described above, or the like) may be adjusted. Although a preset value may be adjusted at any control modes, it may be preferable to adjust a preset value at least at the inverter control mode.

The deviation e shown in FIG. 5 is not limited to the deviation of the differential pressure. According to an exemplary embodiment, the compressor controller 168 may perform a supply pressure control process, which calculates a control output from the deviation between the supply side measurement pressure PH and a preset pressure. In this case, the preset pressure may be the upper limit of the supply side measurement pressure of the compressor. The compressor controller 168 may, in case the supply side measurement pressure PH exceeds this upper limit, calculate a control output from the deviation between the supply side measurement pressure PH and the upper limit. The upper limit may be defined as appropriate either empirically or experimentally based on the maximum supply pressure of the compressor, which guarantees the vacuum performance of the cryopump 10. In this way, an excessive increase of supply pressure can be restricted so that safety can be improved.

According to an exemplary embodiment, the compressor controller 168 may perform a return pressure control process, which calculates a control output from the deviation between the return side measurement pressure PL and a preset pressure. In this case, the preset pressure may be the lower limit of the return side measurement pressure of the compressor. The compressor controller 168 may, in case the return side measurement pressure PL is lower than this lower limit, calculate a control output from the deviation between the return side measurement pressure PL and the lower limit. The lower limit may be defined as appropriate either empirically or experimentally based on the minimum return pressure of compressor, which guarantees the vacuum performance of the cryopump 10. In this way, an excessive increase in temperature of the compressor main body resulting from the decrease of the flux of refrigerant gas accompanied to the decrease of the return pressure. The compressor controller 168 may select and perform the differential pressure stabilization control process, the supply pressure control process, or the return pressure control process described above, based on a measurement value. A preset value adjustment, which will be described below may also be performed while one of the control processes is selected.

In case a plurality of compressor units are applied to the cryopump system 1000 in parallel as shown in FIG. 1, respective compressor units share a common load (i.e., the plurality of cryopumps 10), evenly. Therefore, the operation statuses for respective compressor units are expected to be substantially similar among each other.

However, the present inventor has found out that a phenomenon occurs where the operating frequencies of respective compressor units are diverged over time in practice. It is observed that, in case two compressors have been operated in parallel in the cryopump system 1000 for a certain time period, the operating frequency of one of the compressors always tends to be higher than that of the other compressor. For example it is observed that although both compressors had been operated at 50 Hz when the operation was started, after a while one of the compressors stabilized at operation status of 30 Hz, and the other compressor stabilized at high-load operation status of 70 Hz. One of the compressors is operated under heavy load continuously, which can be disadvantageous to a longer operating life of the entire system.

The divergence is considered to result from individual differences of the compressors. The individual differences include the individual differences of the compressor main body, sensor or other devices provided therewith. Alternatively, the divergence is considered to result from physical differences of separate pipes that connect respective compressors and the cryopumps, for example, differences in the length or the arrangement of the pipes.

Therefore, a definition with respect to control is changed so as to compensate the individual differences of the compressor units according to an exemplary embodiment of the present invention. Thereby, the operation statuses of a plurality of compressor units can be equalized, a concentration of operation on a certain compressor can be avoided, and respective compressors can evenly share a load as appropriate. It has been experimentally confirmed that a fine adjustment of the settings to an extent that does not affect substantially to the performance of an apparatus to which the compressor unit is connected sufficiently restricts the divergence of the operation statuses resulting from the individual differences.

Figure 6:
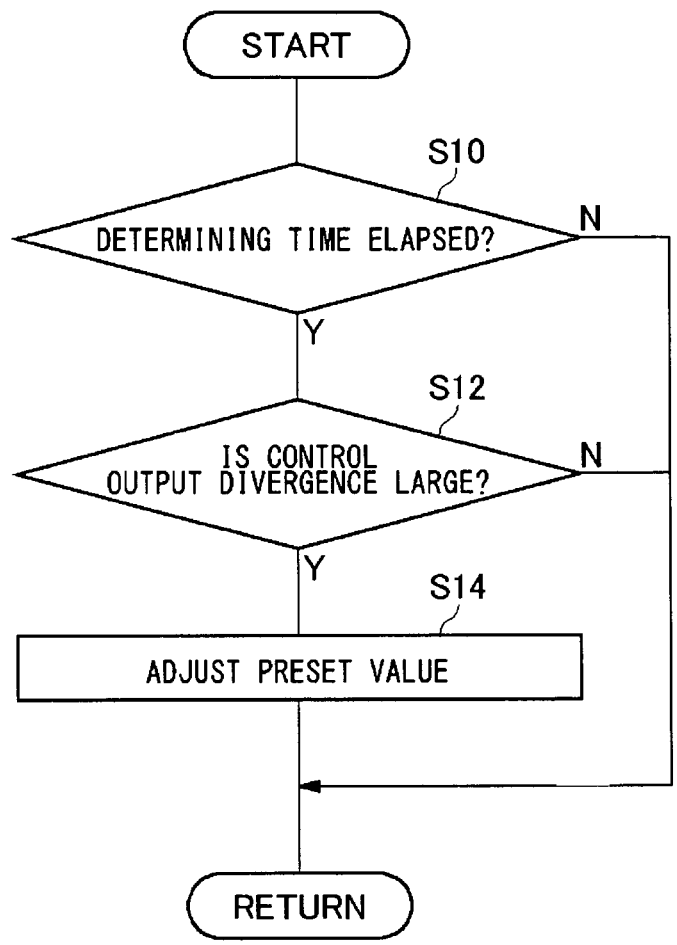
FIG. 6 is a flowchart for illustrating a preset value adjustment process according to an exemplary embodiment of the present invention.

FIG. 6 is a flowchart for illustrating a preset value adjustment process according to an exemplary embodiment of the present invention. The process shown in FIG. 6 is performed by the CP controller 100 repeatedly at predetermined time intervals while a plurality of compressor units are operated simultaneously. The CP controller 100 functions as an upper level controller that monitors control outputs of compressor controllers 168 of respective compressor units. In case a compressor unit having a relatively large control output exists, the CP controller 100 adjusts a preset value relating to one of the compressor units slightly so that the control outputs of respective compressor units are equalized, as a result.

When the number of the compressor units being operated becomes one, the adjustment process is stopped, and when an operation of a plurality of compressor units is started, the adjustment process is restarted. The adjustment process may be preferably performed during the execution of the differential pressure stabilization control process. The adjustment process may be performed regardless of the status of an apparatus to which the compressor unit is connected. For example, the process may be performed regardless of whether the cryopump 10 is under normal pumping operation or under regeneration operation.

As shown in FIG. 6, the CP controller 100 determines whether or not a determining time is elapsed (S10). The determining time can be defined as appropriate experimentally or empirically as a time that is necessary for the operation statuses of the plurality of compressor units to diverge to some extent. The determining time is, for example, one hour. In case the time elapsed from the last process does not exceed the determining time (N in S10), The CP controller 100 terminates the process.

In case the time elapsed from the last process exceeds the determining time (Y in S10), the CP controller 100 determines whether the divergence of the control outputs among the plurality of compressor units is large (S12). For example, in case two compressor units are operated at the same time, the CP controller 100 determines whether or not the difference between the control outputs of the two compressor units exceeds the threshold value. The threshold value can be defined as appropriate as a difference that can be permitted for the control outputs of the two compressor units. The control output may be a control output to the compressor inverter 170 or the operating frequency of the compressor motor 172. The control output may be a control output to the relief valve driver 174 or the control current of the relief valve 162.

In case three or more compressor units are operated at the same time, the CP controller 100 may, for example, determine whether or not the difference in the control outputs between the compressor unit having the maximum control output and the compressor unit having the minimum control output exceeds the threshold value. Alternatively, the CP controller 100 may determine whether or not the difference between the control output of the compressor unit having the maximum control output and the averaged control output of respective compressor units. That is, the CP controller 100 may use any determining criterions for determining whether or not a compressor unit operated with relatively heavy load status exists.

In case the divergence of the control outputs among the plurality of compressor units is determined to be small (N in S12), the CP controller 100 terminates the adjustment process. Meanwhile, in case the divergence of the control outputs among the plurality of compressor units is determined to be large (Y in S12), the CP controller 100 executes the adjustment process of the preset value (S14). According to an exemplary embodiment, the target differential pressure $\Delta P_0$ of the differential pressure stabilization process is adjusted (cf. FIG. 5). Upon changing the preset value by the adjustment process, the CP controller 100 terminates the adjustment process.

According to an exemplary embodiment, the CP controller 100 executes the adjustment process in accordance with an adjustment table shown in FIG. 7. The CP controller 100 updates, a preset value stored, for example in a memory of the compressor controller 168 in accordance with the adjustment table. FIG. 7 shows an adjustment table utilized in an adjustment process according to an exemplary embodiment of the present invention. The table shown in FIG. 7 is an example of an adjustment table used in a state where two compressor units are operated at the same time. The reference symbol A indicates the first compressor unit, and the reference symbol B indicates the second compressor unit. The left side column in the table shown in FIG. 7 indicates a case where (i) preset target differential pressures for two compressor units are identical. The middle column of the table indicates a case where (ii) the preset target differential pressure for one compressor unit A is higher, and the right side column of the table indicates a case where (iii) the preset target differential pressure for the other compressor unit B is higher.

In any of the cases, if the difference in operating frequency, which is an example of the control output, between two compressor units A and B is less than a predetermined value (10 Hz in the example shown in FIG. 7), the target differential pressure $\Delta P_0$ is not changed and is remained at a constant value. The reason thereof is that the small difference in operating frequency leads to an evaluation that there is no divergence, and thus no adjustment is required, accordingly.

An explanation will be given on the case where the difference in operating frequency is more than or comparative to a predetermined value (10 Hz in FIG. 7). In case (i) the preset target differential pressures for two compressor units are identical, and if the operating frequency of one compressor unit A is lower, the target differential pressure $\Delta P_0$ of the other compressor unit B is decreased by 0.01 MPa. The target differential pressure $\Delta P_0$ is, for example, 1.5 MPa. Meanwhile, if the operating frequency of one compressor unit A is higher, the target differential pressure $\Delta P_0$ of the compressor unit A is decreased by 0.01 MPa.

That is, in case the preset target differential pressures for two compressor units are identical, the target differential pressure of a compressor unit whose operating frequency is higher is decreased slightly. By decreasing the target differential pressure, the operating frequency of the compressor motor can be reduced as a result. Therefore, the operating statuses of two compressor units can approach to each other. The operating statuses of two compressor units can be changed to similar statuses, also by slightly increasing the target differential pressure of a compressor unit whose operating frequency is lower.

In case (ii) the preset target differential pressure for the compressor unit A is higher, the target differential pressure of the compressor unit A is maintained and the target differential pressure of the other compressor unit B is adjusted. To be more specific, if the operating frequency of compressor unit A is lower, the target differential pressure $\Delta P_0$ of the compressor unit B is decreased by 0.01 MPa. Meanwhile, if the operating frequency of compressor unit A is higher, the target differential pressure $\Delta P_0$ of the compressor unit B is increased by 0.01 MPa.

In case (iii) the preset target differential pressure for the compressor unit B is higher, the target differential pressure of the compressor unit B is maintained and the target differential pressure of the other compressor unit A is adjusted in a similar manner to the case (ii). To be more specific, if the operating frequency of compressor unit A is lower, the target differential pressure $\Delta P_0$ of the compressor unit A is increased by 0.01 MPa. Meanwhile, if the operating frequency of compressor unit A is higher, the target differential pressure $\Delta P_0$ of the compressor unit A is decreased by 0.01 MPa.

In this manner, among a plurality of compressor units, the target differential pressure of a compressor unit with which a relatively low target differential pressure is defined is adjusted. The CP controller 100 adjusts the target differential pressure of the compressor unit with which a relatively low target differential pressure is defined so as to reduce the difference in operation frequencies between the compressor unit and other compressor unit. It is also possible to adjust the target differential pressure of a compressor unit with which a relatively high target differential pressure is defined so as to reduce the difference in operation frequencies between the compressor unit and other compressor unit.

In a state where more than two compressor units are operated at the same time, the adjustment table shown in FIG. 7 may be applied, for example to a compressor unit having the maximum control output and a compressor unit having the minimum control output.

An adjustment amount to be adjusted at one adjustment process may be preferably an adjustment amount that assures that the change of the vacuum performance of the cryopump 10 is within an allowable range. That is, an adjustment amount at one process may be preferably smaller than the maximum adjustment amount, which assures that the change of the cooling capability of the refrigerator 12 is within an allowable range. Preferably, an adjustment amount at one process may be set to an adjustment amount, which is assured not to affect the capability of the refrigerator 12 or the cryopump 10. Thereby, a compressor can be adjusted without substantially affecting the capability of the refrigerator 12 or the cryopump 10. According to an exemplary embodiment, the adjustment amount of a preset value may be less than or equal to 10% of the preset value at a maximum, preferably less than or equal to 5% of the preset value, more preferably less than or equal to 1% of the preset value. The adjustment amount of 0.01 MPa to the target differential pressure of 1.5 MPa described above, is an example of the adjustment amount, which does not affect to the capability of a cryopump.

A limitation may be provided for a total adjustment amount of a plurality of adjustment processes. For example, an adjustment range may be limited, for example by providing an upper limit or a lower limit to the total adjustment amount, or by defining an adjustment acceptable range on the preset value. According to an exemplary embodiment, the adjustment acceptable range on the preset value may be, at maximum, equal to or less than 10% of the initial value, preferably equal to or less than 10%, more preferably equal to or less than 2%.

Figure 8:
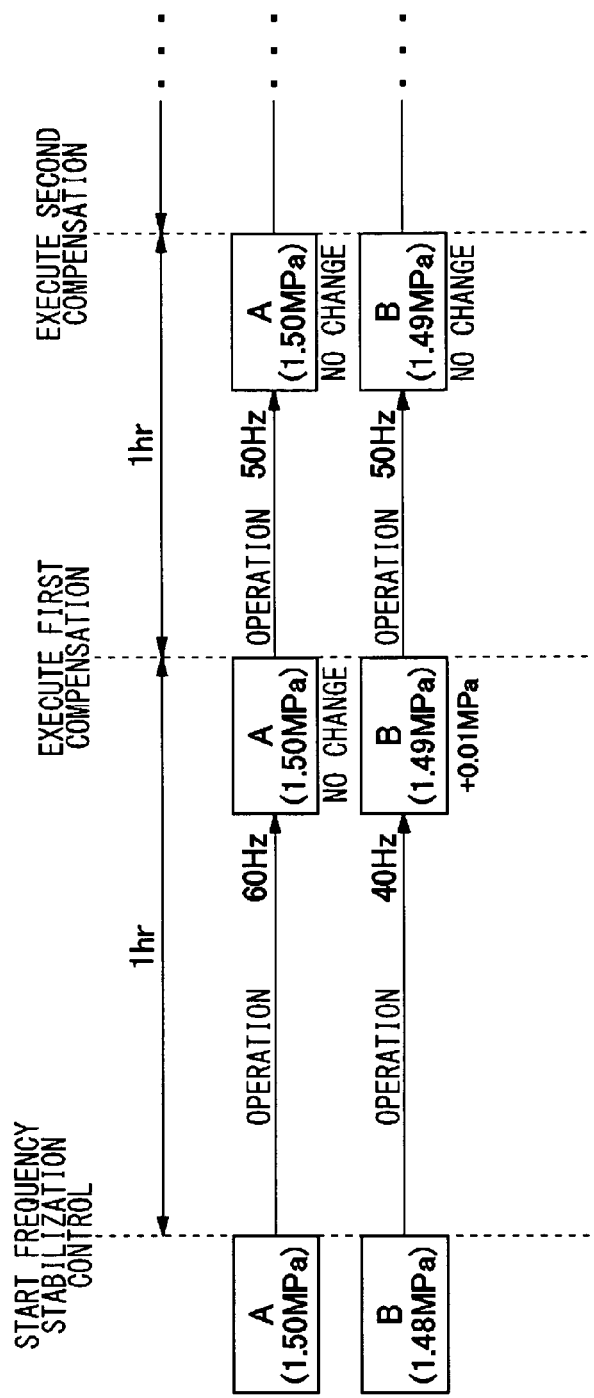
FIG. 8 is a diagram for illustrating an example of the result of the preset value adjustment process according to an exemplary embodiment of the present invention.

FIG. 8 illustrates an example of the result of the preset value adjustment process according to an exemplary embodiment of the present invention. As shown in the figure, when one hour, which is a determining time, passed after starting a control according to an exemplary embodiment of the present invention, one compressor A is operated at operating frequency of 60 Hz and the other compressor A is operated at operating frequency of 40 Hz. It is determined that there is a divergence between the operating statuses, and the target differential pressure of the compressor B is increased by 0.01 MPa in accordance with the adjustment table shown in FIG. 7. As a result, the operating frequencies of the two compressors are both stabilized at 50 Hz at the next adjustment timing, and thus the operating statuses are equalized.

As described above, according to an exemplary embodiment of the present invention, when a plurality of compressor units are operated in parallel at a differential pressure stabilization mode, the control outputs of the compressor units are monitored, and a target differential pressure is fine adjusted within the maximum adjustment amount so that the control outputs of respective compressor units are equalized, as a result. The maximum adjustment amount is an adjustment amount that is deemed to have substantially no effect or sufficiently small effect to the capability of a device, which is a target for the compressor to supply refrigerant gas. In this manner, divergence of operating statuses resulting from the individual differences of the plurality of compressor units is restricted, and the operating life of the entire system is prolonged.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2010-211282, filed Sep. 21, 2010, the entire content of which is incorporated herein by reference.

What is claimed is:

1. A cryopump system comprising:
    a plurality of cryopumps;
    a plurality of compressor units, comprising a first compressor unit and a second compressor unit, arranged to operate in parallel to supply refrigerant gas to the plurality of cryopumps;
    a piping system for supply and return of the refrigerant gas between the plurality of compressor units and the plurality of cryopumps;
    a control unit that controls a first operation frequency of the first compressor unit such that a first differential pressure between a supply side and a return side of the first compressor unit agrees with a first target differential pressure, and that controls a second operation frequency of the second compressor unit such that a second differential pressure between a supply side and a return side of the second compressor unit agrees with a second target differential pressure; and
    a memory that stores an adjustment table that is used for an adjustment process of at least one of the first target differential pressure and the second target differential pressure such that an operation frequency difference between the first operation frequency and the second operation frequency after the adjustment process is less than an operation frequency difference between the first operation frequency and the second operation frequency before, the adjustment process, wherein
    the control unit determines whether the operation frequency difference before the adjustment process is greater than a threshold that is defined in the adjustment table,
    when it is determined that the operation frequency difference before the adjustment process is greater than the threshold, the control unit is configured to execute the adjustment process in accordance with the adjustment table such that:
    (i) when the first target differential pressure and the second target differential pressure are identical and when the first operation frequency is less than the second operation frequency, then the second target differential pressure is decreased, and, when the first target differential pressure and the second target differential pressure are identical and when the second operation frequency is less than the first operation frequency, then the first target differential pressure is decreased, (ii) when the first target differential pressure is higher than the second target differential pressure and when the first operation frequency is less than the second operation frequency, then the first target differential pressure is maintained and the second target differential pressure is decreased, and when the first target differential pressure is higher than the second target differential pressure and when the second operation frequency is less than the first operation frequency, then the second target differential pressure is increased and the first target differential pressure is maintained, (iii) when the second target differential pressure is higher than the first target differential pressure and when the first operation frequency is less than the second operation frequency, then the second target differential pressure is maintained and the first target differential pressure is increased, and when the second target differential pressure is higher than the first target differential pressure and when the second operation frequency is less than the first operation frequency, then the first target differential pressure is decreased and the second target differential pressure is maintained, the cases (i), (ii) and (iii) are defined in the adjustment table.

2. The cryopump system according to claim 1, wherein each of the plurality of cryopumps comprises a cryopanel and a refrigerator that cools the cryopanel by expanding the refrigerant gas in the refrigerator, wherein the adjustment table defines an adjustment amount of the at least one of the first target differential pressure and the second target differential pressure, the adjustment amount which assures that a change in cooling capability of the refrigerator caused by a single adjustment process is maintained within an allowable range of the cooling capability.

3. The cryopump system according to claim 2, wherein the adjustment amount is less than or equal to 10% of the at least one of the first target differential pressure and the second target differential pressure.

4. The cryopump system according to claim 2, wherein the adjustment amount is less than or equal to 5% of the at least one of the first target differential pressure and the second target differential pressure.

5. The cryopump system according to claim 2, wherein the adjustment amount is less than or equal to 1% of the at least one of the first target differential pressure and the second target differential pressure.

6. The cryopump system according to claim 1, wherein a limitation is provided for a total adjustment amount of a plurality of adjustment processes.

* * * * *